United States Patent [19]

Corey

[11] 4,140,172
[45] Feb. 20, 1979

[54] LINERS AND TUBE SUPPORTS FOR INDUSTRIAL AND CHEMICAL PROCESS EQUIPMENT

[75] Inventor: Gerald D. Corey, Simi Valley, Calif.
[73] Assignee: Fansteel Inc., North Chicago, Ill.
[21] Appl. No.: 753,804
[22] Filed: Dec. 23, 1976
[51] Int. Cl.$^2$ ............................................. F28F 21/08
[52] U.S. Cl. ........................................ 165/81; 165/133; 165/134 R; 165/142; 165/175; 165/178; 165/DIG. 8; 285/158; 285/189
[58] Field of Search .................. 165/180, 142, 81, 82, 165/83, 133, 134, DIG. 8, 173, 178, 175, 176, 70; 29/157.4; 285/158, 189

[56] References Cited

U.S. PATENT DOCUMENTS

| | | | |
|---|---|---|---|
| 526,208 | 9/1894 | Wheeler | 165/82 |
| 1,738,914 | 12/1929 | Mott | 165/142 |
| 2,240,537 | 5/1941 | Young | 165/83 |
| 2,303,416 | 12/1942 | Woods | 165/178 |
| 3,001,766 | 9/1961 | Laist | 165/DIG. 8 |
| 3,283,811 | 11/1966 | Harvey | 165/142 |
| 3,447,603 | 6/1969 | Jones | 165/178 |
| 3,583,478 | 6/1971 | Fieni | 165/178 |
| 3,628,603 | 12/1971 | Fieni | 165/178 |
| 3,749,161 | 7/1973 | Hibbeler | 165/178 |
| 4,044,443 | 8/1977 | Chartet | 165/173 |

FOREIGN PATENT DOCUMENTS

| | | | |
|---|---|---|---|
| 191441 | 10/1956 | Austria | 165/82 |
| 884924 | 12/1961 | United Kingdom | 165/82 |

Primary Examiner—Ronald H. Lazarus
Assistant Examiner—Sheldon Richter
Attorney, Agent, or Firm—Barnes, Kisselle, Raisch & Choate

[57] ABSTRACT

Thin liners and tubes of special metals and alloys such as tantalum bonded to substrates or mounted in support plates of metallurgically dissimilar metals and alloys such as mild steel by an elastomer such as a silicone or fluoro elastomer. Also a shock absorbent mounting of tubes telescoped into heat exchanger tubes of special metals by elastomer cushions interposed between the tubes.

23 Claims, 7 Drawing Figures

LINERS AND TUBE SUPPORTS FOR INDUSTRIAL AND CHEMICAL PROCESS EQUIPMENT

This invention relates to special purpose metals having good refractory, oxidation resistance and/or corrosion resistance properties and more particularly, to liners of such metals for and the mounting of tubes of such metals in industrial equipment and especially chemical process equipment.

Typical industrial and chemical process equipment utilizing liners and tubes of special purpose metals are bayonet heaters, heat exchangers, condensers, towers, columns, and pressurized and evacuated vessels, piping, fittings, and valves. Special purpose metals and alloys thereof typically used as liners and tubes in such equipment are the so called reactive metals such as titanium, zirconium, and hafnium; and the so called refractory metals such as tantalum, columbium, and vanadium.

Due to the high cost of and difficulties in fabricating such metals and alloys compared to low carbon steel, such equipment is usually constructed with a relatively thin surface liner or facing of special purpose metal in conjunction with a backing or substrate of another more common and less expensive metal or alloy which is usually metallurgically incompatible with the special purpose metal. Similarly, tubes of special purpose metal are often structurally supported or carried by another metal or alloy which is metallurgically incompatible with the special purpose metal. For example, a liner or tube of tantalum is metallurgically incompatible with a mild steel backing or support plate. Tantalum melts at about 3000° C. (5430° F.) while mild steel melts at about 1530° C. (2790° F.), tantalum has a coefficient of thermal expansion of about one-half of that of mild steel, and alloys of tantalum and iron are brittle (the tantalum-iron phase system contains the brittle intermetallic compound $TaFe_2$, and eutectics of this brittle compound and the terminal iron-rich and tantalum-rich solid solutions have very limited solid solubility. See FIG. 11, page 461 of "Columbium and Tantalum" by F. T. Sisco and E. Epremian, published by John Wiley and Sons, Inc., 1963).

To overcome these metallurgical incompatabilities thin sheets of special purpose metals such as tantalum have been used with mild steel backing plates as either loose liners or as liners intermittently mechanically anchored with suitable fasteners to the backing plate. When such loose and mechanically anchored liners are used in equipment operating under a high vacuum or other conditions in which opposed faces of a liner are subjected to a pressure differential, the normally thin liner must be made thick enough to withstand the forces produced by the pressure differential. A loose or mechanically anchored tantalum liner used under conditions where it is subjected to a pressure differential of one atmosphere is at least 0.020 and preferably 0.030 of an inch or greater in thickness.

In many applications it is desirable or even necessary that the layer of special purpose metal be bonded to the substrate or backing plate. Bonding of a special purpose metal such as tantalum to a mild steel substrate has been previously accomplished by explosive cladding, roll bonding, and brazing. Explosive cladding and roll bonding results in a direct mechanical interlocking and/or metallurgical bonding of a layer of tantalum on a mild steel substrate. This layer of tantalum is usully about 0.030 to 0.060 of an inch thick but may range in thickness up to about 0.125 of an inch. These methods are somewhat limited in regard to the size of the object that can be clad and can be used with only generally flat substrates of uniform geometrical shape. These are also relatively high cost methods for applying a layer of tantalum and the resulting cladding presents additional problems in fabricating and joining together the tantalum layer of separate pieces of cladding to produce a final equipment configuration.

Thin sheets of special purpose metals such as tantalum have been brazed with silver and copper brazing alloys to substrates of mild steel and stainless steel. Techniques for furnace brazing tantalum to stainless steel in a vacuum are described in an article by M. L. Torti and R. W. Douglass entitled "Brazing of Tantalum and Its Alloys" in Refractory Metals and Alloys III: Applied Aspects, Part One, Vol. 30, AIME Metallurgical Society Conference, Dec. 9–10, 1963.

When attempts are made to braze a thin sheet of a special purpose metal such as tantalum to a mild steel substrate, serious difficulties have been experienced, especially when the sheet of tantalum has a large surface area, in obtaining good bonding and a distortion-free tantalum layer because, due to their different coefficients of thermal expansion, during cooling the layer of tantalum brazed to the steel tends to become severely distorted, wrinkled, and buckled. Such distortion may even fracture the bond in some areas. In such a brazed cladding the sheet of tantalum is usually in the range of 0.030 to 0.060 of an inch and the layer of silver or copper brazing alloy is usually about 0.002 to 0.003 of an inch thick.

Tubes of special purpose metal such as tantalum have been previously mounted in mild steel support plates by telescoping the tube through a copper bushing which is slid in an aperture through the plate, and mechanically expanding the tube and the copper bushing to place both of them in compression to thereby frictionally retain the tube in the mild steel support plate. The permanent deformation of the tube caused by the mechanical expansion often results in leakage and premature failure in service of the tube.

In accordance with the present invention, claddings are produced by bonding with an elastomer thin sheets or even foils of special purpose metals such as tantalum to a backing plate of a more common metal such as steel, and tubes of metals such as tantalum are mounted in apertures of mild steel carrier plates by interposing between and bonding an elastomer to both each tube and the carrier plate. Such claddings with an elastomer bonding are easier and less expensive to produce and permit the utilization of a thinner and hence, less expensive liner of a special purpose metal than previously known methods and claddings with liners of special purpose metals. Elastomer bonded claddings can utilize liners and even foils of special purpose metals which are just thick enough to be handled without undue precaution which in the case of tantalum liners may be as thin as about 0.010 to 0.015 of an inch in thickness. Similarly, such mountings of tubes are easier and less expensive to produce and result in fewer leaks and a longer useful life in service compared to previously known mountings of tubes of special purpose metals in support plates of dissimilar metals.

Objects of this invention are to permit fabrication of special purpose metal claddings having more complex shapes and liners which are thinner, have larger surface areas, and can be more easily joined together, and to provided claddings and mountings for tubes of special purpose metals and alloys which are more economical, easier to fabricate, utilize less expensive materials, and have increased useful life in service.

These and other objects, features and advantages of this invention will be apparent from the following detailed description, appended claims, and accompanying drawings in which:

Figure 1:
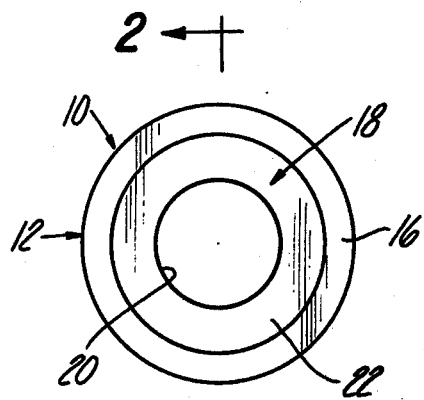
FIG. 1 is an end view of a pipe spool for a vacuum line embodying the present invention.
Figure 2:
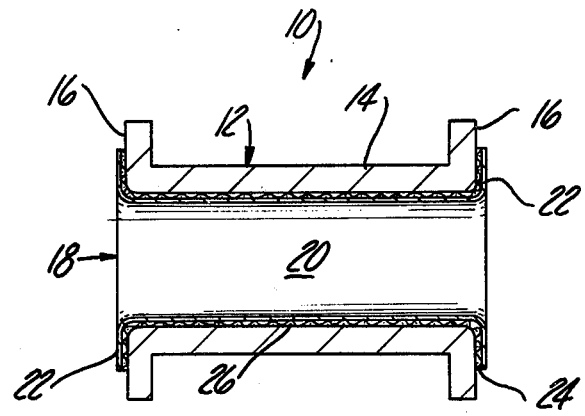
FIG. 2 is a sectional view on line 2—2 of FIG. 1.
Figure 3:
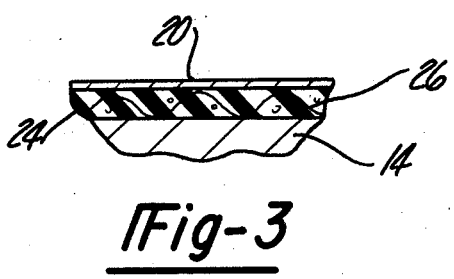
FIG. 3 is an enlarged fragmentary section of the pipe spool of FIG. 1.

Referring in more detail to the drawings, FIGS. 1 through 3 illustrate a pipe spool assembly 10 embodying this invention and having an outer structural shell 12 of low carbon steel with a central tubular position 14 terminating in radially extending mounting flanges 16 on the opposed ends thereof. A complimentary liner 18 of tantalum is received in shell 12 and has a central tubular portion 20 and radially extending flanges 22 at its opposed ends.

In accordance with this invention, and as shown in FIGS. 2 and 3, tantalum liner 18 is bonded to outer shell 12 by a circumferentially continuous layer 24 of an elastomer received between and adhering to the adjacent faces of liner 18 and shell 12. To maintain a substantially uniform thickness of the layer 24 of elastomer while it cures to its solid state, an annular ring of a coarse wire screen 26 of No. 3 mesh is also received between and bears on the tubular portion 14 of spool 12 and the cylindrical portion 20 of liner 18. Preferably the tantalum liner 18 of pipe spool assembly 10 has a thickness in the range of 0.010 to 0.015 and typically about 0.013 of an inch which is about the minimum range of thickness of tantalum sheets which will permit liner 18 to be readily handled, fabricated, and assembled into shell 12.

If in accordance with the prior art a pipe spool similar to assembly 10 were utilized in a vacuum line in which the outer shell 12 was exposed to air at atmospheric pressure and a liner of tantalum similar to liner 18 were loosely received within a structural shell so that the liner was subjected to a pressure differential of about one atmosphere, a liner would have to have a minimum thickness of about 0.020 and preferably be at least about 0.030 of an inch thick. Hence, in pipe spool 10 the layer 24 of elastomer by completely filling the space between and bonding to structural spool 12 and liner 18 prevents the liner from being subjected to a pressure differential when the spool assembly is used in an evacuated line exposed to atmospheric pressure and thus, permits a substantially thinner tantalum liner 18 to be utilized.

Figure 4:
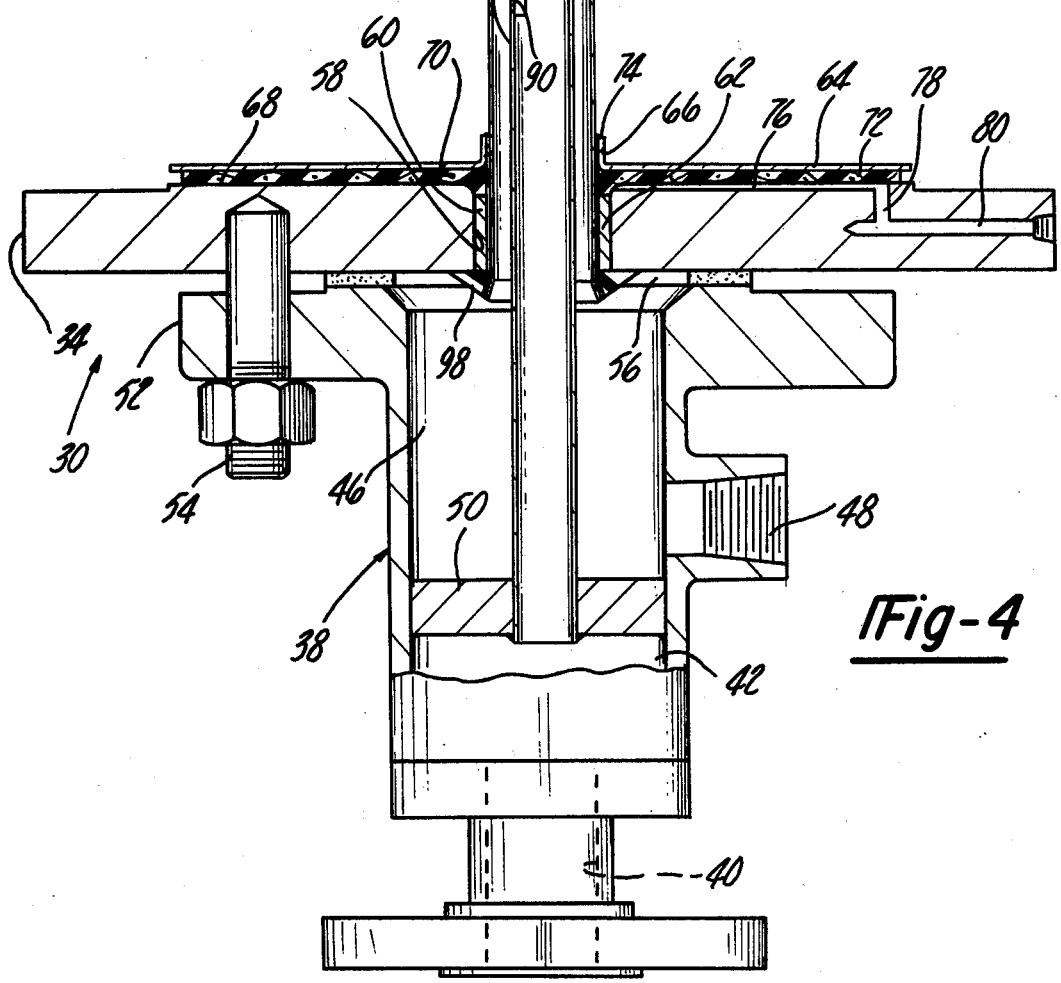
FIG. 4 is a side view partially in section of a bayonet heater embodying the present invention.

FIG. 4 illustrates a bayonet heater 30 embodying this invention which is typically used in chemical process equipment. Heater 30 has a heat exchange tube 32 mounted on a carrier plate 34 which is usually secured to the bottom of a vessel (not shown) so that tube 32 extends generally vertically upward into the vessel and is in contact with a liquid product to be heated. Tube 32 is usually heated by steam discharged through holes 35 from an ejector tube 36 which extends generally coaxially into tube 32 and is fixed at its lower end in a housing 38 carried by plate 34. Steam is admitted to ejector tube 36 via an inlet passage 40 and a chamber 42 in housing 38 and condensate from the annular space 44 between tubes 32 and 36 is discharged through chamber 46 and outlet passage 48. One end of ejector tube 36 is fixed to a divider plate 50 fixed in housing 38 which has a mounting flange 52 secured to carrier plate 34 by a plurality of circumferentially spaced threaded stud and nut assemblies 54 with a gasket 56 providing a seal therebetween.

Heat exchange tube 32 has an end cap 57 fixed and sealed to one end and the other end is mounted in an aperture 58 in plate 34. Tube 32 is telescoped into a sleeve 60 extending through a bushing 62 all of which are mechanically expanded generally radially outward and permanently plastically deformed to place the end portion of tube 32, sleeve 60, and bushing 62 in compression and frictionally retain them in aperture 58 of plate 34 thereby mounting tube 32 on the plate. Heat exchange tube 32, cap 57, and sleeve 60 are of a special purpose metal such as tantalum and plate 34, tube 36, and housing 38 are of a metallurgically dissimilar metal such as mild steel. Preferably bushing 62 is of a metal such as copper which has a coefficient of thermal expansion greater than that of both the steel of plate 34 and tantalum of tube 32 and sleeve 58 so that the bushing will expand more and place the mounting assembly of tube 32 under greater compression when heater 30 is functioning at its operating temperature.

In accordance with this invention, a thin flat liner disc 64 of tantalum with a central aperture defined by an upturned flange 66 is bonded to a face 68 of plate 34 by a layer 70 of an elastomer. To maintain a uniform thickness of the layer 70 of elastomer while it cures a disc of a coarse wire mesh screen 72 is interposed between liner 64 and plate 34. Liner disc 64 is fixed and sealed to sleeve 60 by a circumferentially continuous lip weld 74. To permit testing of the elastomer bond between liner 64 and plate 34 and also to detect any leakage during inservice use of heater 30, weep passages are provided in plate 34 by a plurality of circumferentially spaced grooves 76 extending generally radially across a substantial portion of face 68 and communicating with the exterior of plate 34 through passages 78 and 80.

In accordance with another feature of this invention, tube 36 is resiliently mounted in tube 32 by a plurality of cushions 82 and 84 to eliminate one of the causes of premature structural failure of bayonet heaters by dampening low frequency oscillation induced by circulation of steam and condensate through the heater, a severe boiling and condensation of products on the exterior of and in contact with heat exchanger tube 32, and the flow of viscous products around the exterior of heat exchange tube 32. Cushions 82 are constructed and arranged in annular chamber 44 so that they do not unduly restrict the flow of steam and condensate through the annular chamber and into outlet chamber 46 of housing 38. Adjacent cushions 82 are axially and circumferentially spaced apart in generally diametrically opposed relation in annular chamber 44 and each cushion is a one-piece body of an elastomer having a dome-shaped portion 86 and an integral bulbous portion 88 received in a hole 90 through tube 36 to retain the cushion 82 on the tube. Cushion 84 is also a one-piece body of an elastomer having a first cylindrical portion 92 telescoped into an end of tube 36 and retained therein by a rivet 94 and a second cylindrical portion 96 telescopically received in and bearing on the wall of tube 32.

In accordance with a further feature of this invention, galvanic corrosion of the mounting of tube 32 in plate 34 is prevented by an annular seal 98 of an elastomer overlying copper bushing 62 and bonded to both sleeve 60 and plate 34 so as to isolate copper bushings 62 from steam and condensate in annular chamber 44 and outlet passage 46 of housing 38.

Figure 5:
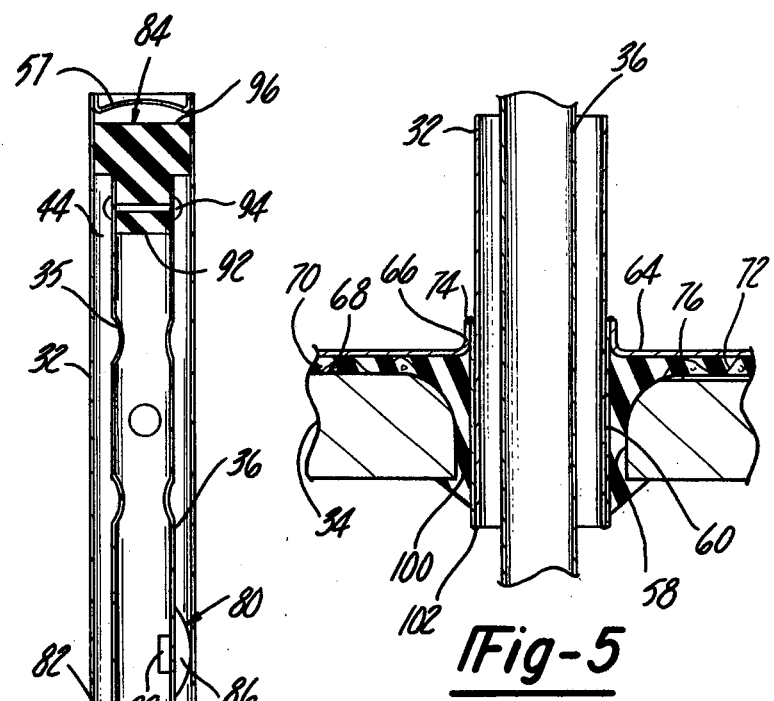
FIG. 5 is a fragmentary sectional view of a modified mounting of a tube in accordance with this invention in the bayonet heater of FIG. 4.

FIG. 5 illustrates a modification of heat exchanger 30 having an improved mounting of heat exchange tube 32 in carrier plate 34 in accordance with another feature of this invention which decreases the incidence of leakage and premature failure in service and eliminates the necessity of expanding and plastically deforming tube 32 and sleeve 60 in order to mount them in carrier plate 34. In this modification sleeve 60 is mounted and retained in aperture 58 of plate 34 by an annulus 100 of an elastomer bonded to both sleeve 60 and aperture 58 of plate 34 and preferably homogeneously integral with the layer 70 of elastomer interposed between plate 34 and tantalum liner 64. Tube 32 is slidably received in sleeve 60 and secured and sealed thereto such as by brazing or by a continuous lip weld 102 at one end of tube 32 and sleeve 60. The use of an elastomer to mount sleeve 60 and hence, tube 32 in plate 34 eliminates leakage and failures caused by the plastic deformation of tube 32 and sleeve 60 utilized in prior art mounting techniques and also provides a resilient mounting which tends to dampen low frequency oscillation and thus, further decrease the incidence of premature failure in service of the bayonet heater.

Figure 6:
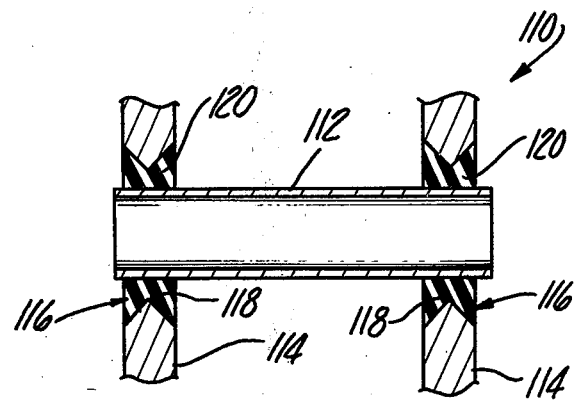
FIG. 6 is a fragmentary side view in section of a heat exchanger having a tube mounted in accordance with this invention.
Figure 7:
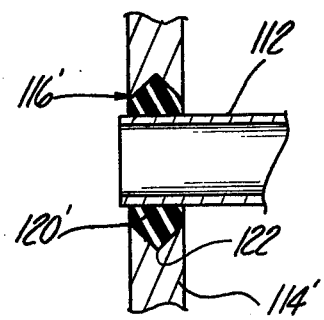
FIG. 7 is a fragmentary side view in section of a modified form of a mounting in accordance with this invention of a tube in a heat exchanger.

FIG. 6 illustrates a heat exchanger 110 having a heat exchange tube 112 of a special metal such as tantalum mounted in accordance with this invention on a pair of carrier plates 114 in parallel, axially spaced apart, and fixed relation to each other. Tube 112 is received in an aperture 116 in each plate 114, which aperture has a generally V-shaped cross section with its apex 118 adjacent the tube. Tube 112 is mounted in aperture 116 of each plate 114 by a ring 120 of an elastomer bonded to both the tube and the plate. FIG. 7 illustrates a mounting of heat exchange tube 112 in a carrier plate 114' which is the same as the mounting shown in FIG. 6 except that aperture 116' has a generally V-shaped cross section with its apex 122 distal from tube 112. Tube 112 is mounted in plate 114' by a ring 120' of an elastomer bonded to both the tube and the plate.

By using apertures with generally V-shaped cross sections the constructions of FIGS. 6 and 7 provide mountings for tube 112 in which a generally radial compressive force is produced in annular rings 120 and 120' to thereby enhance the shear strength of the bond of the elastomer with the tube and the plate regardless of the direction of the generally axial relative displacement of the tube and the plate when the heat exchanger is subjected to thermal excursions both above and below the temperature at which the elastomer of rings 120 and 120' was cured.

The principal criteria for selecting the particular elastomer to be utilized for cushions 82, 84 and for bonding liners and mounting tubes of special metal on metallurgically incompatible substrates and carrier plates is the normal and maximum operating temperature to which the elastomer will be subjected. Silicon rubber is the preferred elastomer and is believed to give good results where the continuous operating temperature is in the range of −140° F. to 500° F. and the intermittent operating temperature does not exceed 650° F. Where the continuous operating temperature to which the elastomer is subjected is in the range of about −40° F. to 450° F. fluoro silicone and fluorocarbon elastomers are also believed to produce satisfactory results.

A silicon rubber elastomer sold by the General Electric Company of Schenectady, New York under the designation RTV-88 when mixed with a tin diphthalate catalyst in the proportions recommended by General Electric has produced satisfactory results in bonding liners and mounting tubes. Preferably, although not necessarily, the surfaces to be bonded with the RTV-88 silicon rubber are first primed with an RTV-4004 primer produced by General Electric Company. For applications having a lower continuous operating temperature a fluorocarbon elastomer sold under the trademark "Viton" by E. I. Du Pont De Nemours and Company has produced satisfactory results and is believed to have a greater resistance to chemical corrosion and deterioration than silicon rubber elastomers. In producing a bond with a fluorocarbon elastomer such as "Viton" it is necessary to apply to the surfaces to be bonded together an adhesive or primer such as alpha cyanoacrylate sold under the trademark "Eastman 910" by Eastman Kodak Company of Rochester, New York.

The thickness of the layer of elastomer utilized to bond a special metal liner to a metallurgically dissimilar substrate or of an annulus of elastomer to mount a special metal tube in a metallurgically dissimilar support plate should be sufficient so that under the anticipated operating temperature the stresses and strains produced in the elastomer do not exceed its apparent modulus of elasticity and hence, result in a separation of the bond. For most applications the thickness of a layer of elastomer bonding a liner of a special metal such as tantalum to a metallurgically dissimilar substrate such as mild steel is in the range of 1/16 to ¼ of an inch and typically about ⅛ of an inch. Similarly, an annulus of elastomer mounting a tube of tantalum up to two inches in diameter and ten feet in length in a mild steel support plate may have a radial thickness in the range of ¼ to ½ and typically ⅜ of an inch and an axial width in the range of 1 to 3 and typically 2 inches. Preferably all equipment utilizing an elastomer to bond a liner or mount a tube is constructed and arranged so that the elastomer is subjected to only compressive and shear stresses since silicone and fluoro elastomers and particularly silicone elastomers have relatively low tensile strength. A satisfactory theoretical analysis of stresses and strains in elastomer joints for determining the configuration and thickness of elastomers utilized to bond liners of special metal to metallurgically incompatible substrates and mount special metal tubes in metallurgically incompatible support plates is contained in an article entitled "Stresses in Adhesive Joints" by H. A. Perry, published in the July 7, 1958 issue of Product Engineer.

As an example of the preferred manner and process of bonding liners and mounting tubes of special purpose metals to metallurgically dissimilar substrates and support plates, the bonding with an elastomer of tantalum liner 64 to mounting plate 34 of bayonet heater 30 and of mounting tube 32 in the plate in accordance with the modification of FIG. 5 will be described. Tube 32, sleeve 60, and liner 64 may be fabricated by conventional metal working techniques of commercially pure unalloyed tantalum or preferably of a tantalum alloy such as Fansteel "63" Metal manufactured by Fansteel Inc. The Fansteel "63" Metal contains 2.5 weight percent tungsten, and 0.15 weight percent columbium with the balance essentially tantalum as more fully disclosed in U.S. Pat. No. 3,592,639 assigned to Fansteel Inc. This tantalum alloy has an ultimate tensile strength about fifty percent higher and a yield strength of about twice that of unalloyed tantalum at a temperature of about 400° F. which is a common operating temperature of chemical process equipment. The corrosion resistance of this alloy is at least equal to pure tantalum in many enrivonments.

To permit the tantalum parts to be welded together and to assure good bonding of the elastomer to plate 34, screen 72, and the tantalum parts, they must all be thoroughly cleaned and degreased. The tantalum parts are chemically cleaned by pickling them in an acid solution such as:

Nitric Acid (70%) — 3 parts by volume (60% by volume)

Sulphuric Acid (95%) — 1 part by volume (20% by volume)

Hydrofluoric Acid (48%) — Up to 1 part by volume (Up to 20% by volume)

After immersion in the acid solution the tantalum parts are removed and immediately immersed in a clean cold water rinse which is followed by a separate warm water rinse at a temperature of at least 125° F. and then immersed in alcohol and dried.

Plate 34, screen 72, and the tantalum parts are degreased with a chlorinated solvent such as trichloroethylene by immersion or wiping, subsequently immersed or wiped with a ketone or alcohol solvent to remove any residual petroleumbased products and any moisture, and thereafter dried such as by wiping with a clean lint-free white cloth.

To avoid deterioration or decomposition of the elastomer by excessive heat, preferably all welding or brazing of the tantalum parts and plate 34 is completed prior to bonding the liner to the plate. In welding tantalum, adequate cleaning and shielding of the weld area with an inert gas is required. Tantalum can be successfully fusion welded using such techniques as inert gas, shielded tungsten arc welding (often called TIG or GTA welding) and electron beam welding. Continuous lip welds 74 and 102 of the opposed ends of sleeve 60 to tube 32 and flange 66 of liner 64 are made by TIG welding in a suitable welding chamber. The welding chamber is evacuated and purged with argon gas or other inert gases such as helium, neon, krypton, and xenon. The inert gases are of high purity and in the case of argon with an oxygen content not exceeding 5 PPM and preferably not more than 1.5 PPM. To further provide an essentially contamination-free environment in the welding chamber, TIG welds are first made on tabs of titanium until bright welds are obtained and only then is any welding done on the tantalum parts.

The weep grooves 76 and passages 78 and 80 of plate 34 are filled with wax, and a coat of General Electric RTV-4004 primer is brushed on face 68 and in aperture 58 of plate 34, the inner face of liner 64, and the exterior of sleeve 60. This primer is allowed to air dry at ambient temperature for at least one hour. The General Electric RTV-88 silicone rubber elastomer is mixed with a tin diphthalate catalyst in accordance with the manufacturer's instructions and produces a thixotropic paste which is spread with a towel on face 68 of plate 34 while it is lying in a generally horizontal plane and leveled with a roller to provide a substantially uniform layer of uncured elastomer about ⅛ to 3/16 of an inch thick on face 68. Coarse wire screen 72 is placed over and pushed through the layer of uncured silicone rubber to bear on face 68. The assembly of tantalum liner 64, sleeve 60, and tube 32 is placed over the layer of silicone rubber with sleeve 60 and the lower end of tube 32 extending through and centered in aperture 58 of plate 34.

With a soft roller, tantalum liner 64 is rolled flat and urged into engagement with screen 72. A pressure pad having a ring of Styrofoam with a flat face and a rigid backing plate with a central clearance hole therethrough is passed over tube 32, so the flat face of the ring of Styrofoam bears on the tantalum liner 64, and clamped at six circumferentially spaced points to plate 34. Plate 34 with linear 64 and the pressure pad clamped thereto is then turned over and the annular space between aperture 58 of plate 34 and tantalum sleeve 60 is also filled with the RTV-88 silicone rubber and catalyst mixture.

The silicone rubber is allowed to cure at ambient temperature for 36 hours and then the clamps and the pressure pad are removed and the resulting assembly is heated by steam to melt and remove the wax from grooves 76 and passages 78 and 80. Any excess silicone rubber may be trimmed from the faces of plate 34.

If in use of heater 30 tantalum liner 64 will be subjected to a vacuum, the effect of such operating conditions upon the bond of layer 70 of the silicone rubber elastomer to plate 34 and liner 64 can be approximately simulated to determine if the liner will separate from the plate 34 by supplying air at a pressure of 15 PSIG to passages 76 and observing the exposed face of the tantalum layer to see if there is any buckling thereof. If the tantalum liner is to be used in a vacuum, it is believed to be desirable, although usually not necessary, to cure the silicone rubber elastomer in an evacuated chamber at ambient temperature to remove any air entrained in the uncured silicone rubber.

I claim:

1. A liner assembly for industrial and chemical process equipment comprising: a metallic substrate consisting essentially of iron group metals and alloys thereof, a metallic liner sheet of special purpose metals consisting essentially of titanium, zirconium, hafnium, tantalum, columbium, vanadium, and alloys thereof which have a coefficient of thermal expansion differing substantially from that of said metallic substrate and if alloyed with iron are brittle, said liner sheet overlying said metallic substrate, a layer of an elastomer interposed between and bonded to at least a substantial portion of one face of an imperforate portion of said liner sheet having a nominal thickness of not greater than 0.020 of an inch and also bonded to an underlying coextensive and imperforate portion of an adjacent face of said substrate to adhere said liner sheet to said substrate and permanently retain said liner sheet on said substrate without any wrinkling and warping of said substantial portion of said liner sheet when after bonding the liner assembly is raised from room temperature to an elevated temperature of 400° F., and said substantial portion of said liner sheet bonded to said substrate by said elastomer being thin enough and of sufficient length that it would buckle and wrinkle if it were fixed throughout directly to said substrate by brazing.

2. The liner assembly of claim 1 wherein said metallic liner sheet consists essentially of tantalum, columbium, vanadium, and alloys thereof.

3. The liner assembly of claim 1 wherein said metallic substrate consists essentially of steel.

4. The liner assembly of claim 1 wherein said metallic liner sheet consists essentially of tantalum and said metallic substrate consists essentially of steel.

5. The liner assembly of claim 1 wherein said elastomer consists essentially of silicone rubber, fluoro silicone and fluorocarbon elastomers.

6. The liner assembly of claim 1 which also comprises a screen interposed between and bearing on both said substrate and said liner sheet and lying in said layer of an elastomer with said elastomer extending through the meshes of said screen, said screen having been interposed between said substrate and said liner sheet before said elastomer was cured so that said layer of elastomer when cured has a substantially uniform thickness.

7. The liner assembly of claim 1 wherein said metallic liner sheet has a nominal thickness in the range of 0.010 to 0.020 of an inch.

8. The liner assembly of claim 1 wherein said substrate, layer of elastomer, and liner sheet have an aperture therethrough and the liner assembly also comprises a metallic tube consisting essentially of titanium, zirconium, hafnium, tantalum, columbium, vanadium, and alloys thereof which have a coefficient of thermal expansion differing substantially from that of said metallic substrate and if alloyed with iron are brittle, said tube extending into said aperture and being connected and sealed to said liner sheet, and an elastomer received in said aperture between and bonded to both said tube and said substrate so as to mount said tube on said substrate.

9. The liner assembly of claim 8 wherein the portion of said substrate defining said aperture has a generally V-shaped cross section.

10. The liner assembly of claim 1 wherein said substrate, layer of elastomer, and liner sheet have an aperture therethrough and the liner assembly also comprises a metallic sleeve extending through said aperture and consisting essentially of titanium, zirconium, hafnium, tantalum, columbium, vanadium, and alloys thereof which have a coefficient of thermal expansion differing substantially from that of said metallic substrate and if alloyed with iron are brittle, said metallic sleeve being connected and sealed to said liner sheet by a circumferentially continuous metal joint consisting essentially of a weld or a braze a metallic bushing shorter in length than said sleeve and received in said aperture between and in direct engagement with and bearing on both said sleeve and substrate and having a coefficient of thermal expansion greater than both the coefficient of thermal expansion of said sleeve and said substrate, and a continuous ring of an elastomer overlying an edge of said bushing and bonded to the portion of the sleeve extending beyond said bushing and to the adjacent faces of said liner sheet and said substrate so as to seal said bushing from a corrosive environment.

11. The liner assembly of claim 10 which also comprises a metallic tube consisting essentially of titanium, zirconium, hafnium, tantalum, columbium, vanadium, and alloys thereof which have a coefficient of thermal expansion differing substantially from that of said metallic substrate and if alloyed with iron are brittle, said tube being telescopically received in said sleeve and frictionally retained in compression with said sleeve.

12. The liner assembly of claim 1 wherein said substrate, layer of elastomer, and liner sheet have an aperture therethrough and the liner assembly also comprises a metallic sleeve extending through said aperture and fixed and sealed to said liner sheet by a circumferentially continuous metal joint consisting essentially of a weld or a braze, a first elongate metallic tube received in said sleeve and fixed and sealed to said sleeve by a circumferentially continuous metal joint consisting essentially of a weld or a braze, said sleeve and said first tube each consisting essentially of titanium, zirconium, hafnium, tantalum, columbium, vanadium, and alloys thereof which have a coefficient of thermal expansion differing substantially from that of said metallic substrate and if alloyed with iron are brittle, a second tube extending axially into said first tube and being spaced radially inwardly thereof, said second tube consisting essentially of an iron group metal and alloys thereof and having a coefficient of thermal expansion differing substantially from that of said first tube, and a plurality of resilient cushions of an elastomer received between said tubes and constructed and arranged to prevent said tubes from engaging each other while permitting a fluid to flow generally axially in at least one direction through said space between said tubes and beyond said cushions to the exterior of said space and to dampen low frequency oscillations induced during service.

13. The liner assembly of claim 12 wherein at least two of said cushions each have a generally dome-shaped portion received between said tubes and are axially and circumferentially spaced apart so as to be generally diametrically opposed and axially spaced relative to each other.

14. The liner assembly of claim 12 wherein said one end of said second tube terminates within and a distance from an end of said first tube and the liner assembly also comprises a resilient plug of an elastomer having a first portion carrying said second tube adjacent said one end thereof and a second portion received within and carried by said first tube and constructed and arranged so as to space said one end of said second tube generally radially inward of and from the wall of said second tube and the end of said first tube.

15. The liner assembly of claim 1 wherein said substrate, layer of elastomer, and liner sheet have an aperture therethrough and the liner assembly also comprises a metallic sleeve consisting essentially of titanium, zirconium, hafnium, tantalum, columbium, vanadium, and alloys thereof which have a coefficient of thermal expansion differing substantially from that of said metallic substrate and if alloyed with iron are brittle, said sleeve extending through said aperture and being sealed to said liner sheet by a circumferentially continuous metal joint consisting essentially of a weld or a braze, a metallic tube consisting essentially of titanium, zirconium, hafnium, tantalum, columbium, vanadium, and alloys thereof which have a coefficient of thermal expansion differing substantially from that of said metallic substrate and if alloyed with iron are brittle, said tube being telescopically received in said sleeve and fixed and sealed to said sleeve by a circumferentially continuous metal joint consisting essentially of a weld or a braze, and an elastomer received in said aperture between and bonded to both said sleeve and to the adjacent faces of said liner and said substrate so as to mount said sleeve and said tube telescoped therein on said substrate.

16. The liner assembly of claim 15 which also comprises a second tube extending generally axially into said metallic tube and being spaced radially inward thereof and terminating at one end within and spaced from said metallic tube, said second tube consisting essentially of an iron group metal and alloys thereof and having a coefficient of thermal expansion differing substantially from that of said metallic tube, and a resilient plug of an elastomer having a first portion carrying said second tube adjacent said one end thereof and a second portion carried by and received within said metallic tube and constructed and arranged to space said one end of said second tube wholly radially inward of and from the wall of and from the end of said metallic tube.

17. The liner assembly of claim 15 which also comprises a second tube extending generally axially into and spaced radially inwardly of said metallic tube, said second tube consisting essentially of an iron group metal and alloys thereof and having a coefficient of thermal expansion differing substantially from that of said metallic tube, and a plurality of cushions of a resilient elastomer interposed and mounted between said tubes and constructed and arranged so as to permit fluid to flow generally axially in at least one direction through the space between said tubes and beyond said cushions and to dampen low frequency oscillations induced during service.

18. The liner assembly of claim 17 wherein said one end of said second tube terminates within and a distance from the end of said metallic tube and also comprises a resilient plug of an elastomer having a first portion extending into said second tube through said one end thereof and a second portion received in and bearing on the interior wall of said metallic tube and constructed and arranged to position said one end of said second tube radially inward of and spaced from the wall of and from the end of said metallic tube.

19. A liner assembly for industrial and chemical process equipment comprising: a metallic substrate consisting essentially of iron group metals and alloys thereof, a metallic liner sheet of special purpose metals consisting essentially of titanium, zirconium, hafnium, tantalum, columbium, vanadium, and alloys thereof which have a coefficient of thermal expansion differing substantially from that of said metallic substrate and if alloyed with iron are brittle, said liner sheet overlying said metallic substrate, a layer of an elastomer interposed between and bonded to at least a substantial portion of one face of an imperforate portion of said liner sheet and also bonded to an underlying coextensive and imperforate portion of an adjacent face of said substrate to adhere said liner sheet to said substrate and permanently retain said liner sheet on said substrate without any wrinkling and warping of said substantial portion of said liner sheet when after bonding the liner assembly is raised from room temperature to an elevated temperature of 400° F., and said substantial portion of said liner sheet bonded to said substrate by said elastomer being thin enough and of sufficient length that it would buckle and wrinkle if it were fixed throughout directly to said substrate by brazing.

20. A liner assembly for industrial and chemical process equipment comprising, a metallic substrate consisting essentially of iron group metals and alloys thereof, a metallic liner sheet overlying said metallic substrate, and liner sheet and substrate having an aperture therethrough, a metallic sleeve extending through said aperture and being sealed to said liner sheet by a circumferentially continuous metal joint consisting essentially of a weld or braze, said liner sheet and sleeve each consisting essentially of titanium, zirconium, hafnium, tantalum, columbium, vanadium, and alloys thereof which have a coefficient of thermal expansion differing substantially from that of said metallic substrate and if alloyed with iron are brittle, a metallic bushing shorter in length than said sleeve and received in said aperture between and in direct engagement with and bearing on both said sleeve and substrate and having a coefficient of thermal expansion greater than the coefficient of thermal expansion of said sleeve and said substrate, an elastomer interposed between and bonded to at least a substantial portion of one face of an imperforate portion of said liner sheet and also bonded to an underlying coextensive portion of an adjacent face of said substrate to adhere said liner sheet to said substrate and permanently retain said liner sheet on said substrate without any wrinkling and buckling of said liner sheet, and a continuous ring of an elastomer overlying an edge of said bushing and bonded to a portion of the sleeve extending beyond said bushing and to the adjacent faces of said liner sheet and said substrate so as to seal said bushing from a corrosive environment.

21. The liner assembly of claim 20 which also comprises a metallic tube consisting essentially of titanium, zirconium, hafnium, tantalum, columbium, vanadium, and alloys thereof which have a coefficient of thermal expansion differing substantially from that of said metallic substrate and if alloyed with iron are brittle, said tube being telescopically received in said sleeve and frictionally retained in compression with said sleeve.

22. A liner assembly for industrial and chemical process equipment comprising: a metallic substrate consisting essentially of iron group metals and alloys thereof, a metallic liner sheet overlying said metallic substrate, said liner sheet and said substrate having an aperture therethrough, a metallic sleeve extending through said aperture and being sealed to said liner sheet by a circumferentially continuous metal joint consisting essentially of a weld or a braze, a metallic tube telescopically received in said sleeve and sealed to said sleeve by a circumferentially continuous metal joint consisting essentially of a weld or a braze, said liner sheet, sleeve, and tube each consisting essentially of titanium, zirconium, hafnium, tantalum, columbium, vanadium, and alloys thereof which have a coefficient of thermal expansion differing substantially of that of said metallic substrate and if alloyed with iron are brittle, an elastomer interposed between and bonded to at least a substantial portion of one face of an imperforate portion of said liner sheet and also bonded to an underlying coextensive portion of an adjacent face of said substrate so as to adhere said liner sheet to said substrate to permanently retain said liner sheet on said substrate without any wrinkling and buckling of said liner sheet, and an elastomer received in said aperture between and bonded to both said sleeve and to the adjacent faces of said liner sheet and said substrate so as to mount said sleeve and said tube telescoped therein on said substrate.

23. The liner assembly of claim 22 which also comprises a second tube extending generally axially into said metallic tube and being spaced radially inward thereof and terminating at one end within and spaced from said metallic tube, said second tube consisting essentially of an iron group metal and alloys thereof and having a coefficient of thermal expansion differing substantially from that of said metallic tube, and a resilient elastomer means received within said metallic tube and engaging said second tube and constructed and arranged to position and maintain said one end of said second tube wholly radially inward of and spaced from the wall of said metallic tube.

* * * * *